Jan. 9, 1962 S. M. COLLINS Re. 25,112
FOLDING CLOSURE
Original Filed Feb. 1, 1952
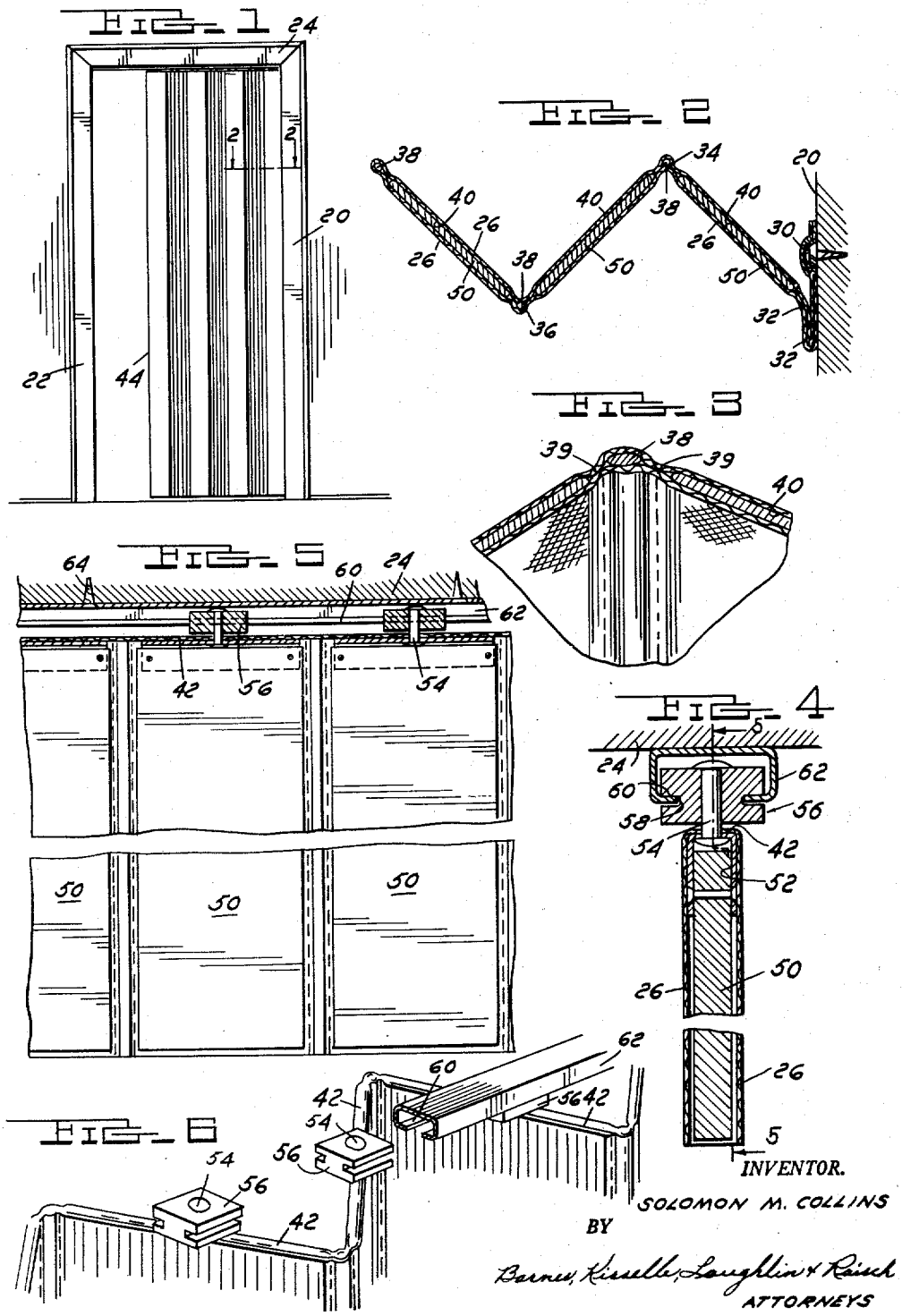

United States Patent Office

Re. 25,112
Reissued Jan. 9, 1962

25,112
FOLDING CLOSURE

Solomon M. Collins, Detroit, Mich., assignor to Clopay Corporation, Cincinnati, Ohio, a corporation of Maryland Original No. 2,667,218, dated Jan. 26, 1954, Ser. No. 269,410, Feb. 1, 1952. Application for reissue Jan. 26, 1959, Ser. No. 799,830
6 Claims. (Cl. 160—199)

Matter enclosed in heavy brackets [ ] appears in the original patent but forms no part of this reissue specification; matter printed in italics indicates the additions made by reissue.

This invention relates to a folding closure, particularly for use in doors of homes and commercial establishments.

It has been known to have folding doors of the wood panel type and also using collapsible plastic folds of the accordion type.

It is an object of the present invention to provide an attractive looking folding door which may be easily installed in a household opening without special built-in hardware and which can be prepared from easily available materials to provide an inexpensive but attractive door closure. Furthermore, the proposed construction provides a hingeless door, one that requires no expensive hand installations of inset hinges.

It is a further object of the invention to provide a particular construction for a folding door closure which lends itself particularly to the type of material being used and also provides a construction which may be adapted to many different types of material in the way of colors, designs and so forth.

The device may be used with fabrics or leather or synthetic plastic sheet materials with any number of combinations of patterns and colors. A simple and effective holding device makes it possible to mount the unit quickly and easily.

Briefly, the invention consists of double sheets of decorative material such as leather, plastic or fabric which are sewed into vertical pockets, closed at the top, and in which is inserted a stiffening panel of inexpensive material provided with a supporting device which projects through the top of the pockets to co-operate with a slide.

Other details of the invention will be evident in the following description and claims.

Drawings accompany the specification, and the various views thereof may be briefly described as:

FIGURE 1, an elevation of a completed doorway showing the folding closure in position.

FIGURE 2, a sectional view on line 2—2 of FIGURE 1.

FIGURE 3, an enlarged perspective view showing a joint between two pockets in the material.

FIGURE 4, a vertical section transversely of the closure member showing the supporting slide and the details of the holding means.

FIGURE 5, a sectional view on line 5—5 of FIGURE 4.

FIGURE 6, a perspective view of the device showing the relationship of the supporting means to the folding pockets.

In FIGURE 1 of the drawings a completed folding door of the type to be described is shown in partially open position. The door frame has two vertical members 20 and 22 and a lintel member 24.

As shown in FIGURES 2, 3, 4 and 5, the door panel consists of a double sheet of material 26 which is fastened at one edge by snap fasteners 30 to the vertical riser 20 of the door frame. The material 26 is fastened together at 32 to provide a stable hinging panel. At spaced intervals the material 26 is also fastened together to provide hinge areas. In FIGURE 2 these are shown at 34 and 36.

A cord member 38 is locked between seams 39 in the material to provide a neat appearing joint. If the material is a fabric, it may be stitched on either side of the cord member. If it is a plastic material, it may be welded either by the application of heat or the application of a solvent, depending on the nature of the plastic.

The formation of the seams at spaced intervals in the double material provides envelopes or pockets 40 which are closed at the top at 42, as shown best in FIGURE 6. This construction continues to the edge 44, which is the free edge of the panel.

The construction of the folding panel is completed by inserting within the envelopes 40 stiffener panels 50 formed of thin plates of hard wood, pressed wood, plastic, light metal or similar equivalent material. These plates fill the pockets as shown in sectional drawings and extend substantially the full length of the pockets.

At the top of the plates 50 are inverted channels 52 which are riveted to the top edge of the plates and which have passing through the top wall thereof a supporting rivet 54. This supporting rivet passes through a slide block 56 having side grooves 58 which co-operate with inturned edges 60 of a channel member 62 fastened to the lintel 24 by screws 64, FIGURE 5.

There is an opening in the top closing edge 42 of the envelope which permits the passage of the slide blocks 56 through the top of the envelope as the plates are inserted. Each panel member, therefore, of the closure unit is supported independently and slidably, the rivets 54 being relatively rotatable so that there is free rotation with the block 56. Thus, the door panel may be opened and closed simply by sliding the blocks 56 and by manipulating them through the suspended panels as they appear in FIGURE 1.

The assembly of the slide blocks 56 into the track 62 can be accomplished before the entire device is suspended or it can be accomplished through a suitable opening provided at one end of the track.

It will thus be seen that there is disclosed an inexpensive envelope type of folding closure which is readily adaptable to many types of household materials which can be mounted in practically any vertical opening as an attractive and inexpensive closure member.

I claim:

[1. A folding closure member for vertical openings such as doors which comprises a doubled sheet of flaccid material having a length substantially equal to the height of the opening to be closed and a width substantially equal to the width of said opening, said doubled sheet being joined together in vertical seams spaced along its width to form pockets extending substantially the length of the sheet, and stiffening means comprising panels of relatively rigid material compared to the sheet material slidable into said pockets substantially the full length thereof, fastening means on said panels adjacent the top of said closure member and passing freely through said sheet material, and means slidably associating said fastening means with the top of the opening to be closed to permit said pockets of the closure member to fold together and to extend horizontally.]

[2. A folding closure member for vertical openings such as doors which comprises a doubled sheet of flaccid material having a length substantially equal to the height of the opening to be closed an a width substantially equal to the width of said opening, said doubled sheet being joined together in vetrical seams spaced along its width to form pockets closed at the top except for a small central opening and extending substantially the length of the sheet, and stiffening means comprising panels of relatively rigid material compared to the sheet material slidable ito said pockets substantially the full length thereof, fas-
ening means on said panels adjacent the top of said clo-
ure member and passing freely through said sheet mate-
al, and means slidably associating said fastening means
vith the top of the opening to be closed to permit said
ockets of the closure member to fold together and to
xtend horizontally.]

[3. A folding closure member for vertical openings
ich as doors having vertical riser members and a con-
ecting lintel which comprises a doubled sheet of flexible,
accid decorative material having a length substantially
qual to the height of the opening to be closed and a
idth substantially equal to the width of said opening,
aid doubled sheet being joined together at the side and
op edges and in vertical seams spaced along its width to
orm pockets extending substantially the length of the
heet and having a horizontal dimension approximating
he width of the frame members forming the opening, and
nitary means received in each of said pockets each hav-
g suspension means mounted thereon projecting freely
hrough the top of said pockets, and slide means fastened
n said lintel to cooperate with said suspension means to
ermit each pocket of said closure member to slide as
panel and to fold relative to the adjacent panel.]

[4. A folding closure member as defined in claim 3
which the unitary means comprises a relatively thin,
gid plate of stiffening material.]

[5. A folding closure member for vertical openings
ich as doors having a vertical riser and a connecting
ntel to form the frame therefor which comprises a
oubled sheet of decorative material having a consistency
ich as fabric, leather, and synthetic sheet material and
aving a length substantially equal to the height of the
pening to be closed and a width at least equal to the
idth of said opening, said doubled sheet being closed at
e top and the vertical edges and being joined together
vertical seams spaced along its width to form pockets
xtending substantially the length of said sheet, relatively
in, rigid plate means in each of said pockets, fastening
eans passing freely through the closed top edge of said
oubled sheet, and slide means fastened on said lintel to
-operate with said fastening means to suspend the
oubled sheet on the stiffening panels.]

6. A folding closure member for vertical openings such
doors having a vertical riser and a connecting lintel
form the frame therefor which comprises a doubled
eet of decorative material having a consistency such as
bric, leather, and synthetic sheet material and having
length substantially equal to the height of the opening
be closed and a width at least equal to the width of
id opening, said doubled sheet being closed at the top
d the vertical edges, a plurality of stiffening plates posi-
oned between the sheets of material forming said clo-
re members in relatively closed spaced relation and
tending substantially the full length of said sheet, means
position said plates within the doubled sheet in verti-
l spaced relation, and means on said plates to slidably
spend each of said plates at the top and from the lintel,
id sheet material being supported entirely on said plates
d said sheet of material constituting the sole connection
tween the plates.

[7. A folding closure member for vertical openings
hich comprises a sheet of material having a length sub-
ntially equal to the height of the opening, pockets
rmed substantially the entire length of said sheet of
aterial, separate flat, elongate stiffening members re-
ned in said pockets extending vertically in spaced rela-
n, individual supporting means, each mounted on and
sitioned centrally and adjacent the top of said stiffening
embers, and slide means supportable at the top of an
ening to co-operate with said individual suspension
eans to provide a sliding suspension for said closure
ember, said sheet of material being supported entirely
said stiffening members.]

[8. A foldable closure for doorways which comprises a plurality of thin, flat, elongate panels adapted to form a door when in aligned position, separate supporting means at the top of each panel centrally thereof, a track for slidably mounting said supporting means at the top of a door opening, and an ornamental sheathing for said panels covering each side and joined between said panels to space the panels and being flexible to form with the panels a hinged series of panels positionable at will in closely spaced, parallel relation or in aligned relation, the joined portions of the sheathing forming the sole hinge between the panels.]

9. A combination as defined in claim 8 in which the sheathing is closed at the top to receive its sole support from the top edges of said panels.

10. A combination as defined in claim 9 in which the sheathing is open at the bottom to permit the removal and replacement of individual panels.

[11. A foldable closure for doorways which comprises a plurality of thin, flat, elongate, relatively stiff, form-retaining, uniformly dimensioned panels adapted to form a door when in aligned position, separate supporting means at the top of each panel centrally thereof, a track for slidably mounting said supporting means at the top of a door opening, and an ornamental sheathing for said panels covering each side and joined between said panels to space the panels and being flexible to form with the panels a hinged series of panels positionable at will in closely spaced, parallel relation or in aligned relation, the joined portions of said sheathing forming the sole hinge between said panels.]

*12. A foldable closure for walk through doorways which comprises, a plurality of thin, flat, elongate, relatively stiff, form-retaining, uniformly dimensioned panels of substantially door length, adapted to form a door when in aligned position, a track for slidably mounting said panels at the top end only, at the top of a door opening, separate supporting means at the top of each said panel centrally thereof and slidably and pivotally engaging said track, and a flexible ornamental sheathing on and supported by said panels covering each side and extending the full length thereof and joined between the panels spacing the panels from each other and forming when in use, hinges between the panels, thereby creating a hinged series of panels positionable at will in closely spaced parallel relation or in aligned relation, the joined portions of the sheathing forming the sole hinge between the panels.*

*13. A foldable closure for doorways which comprises, a plurality of thin, flat, elongate, relatively stiff, form-retaining, uniformly dimensioned panels adapted to form a door when in aligned position, a flexible ornamental sheathing on both sides of said panels supported by and joined between said panels to space the panels from each other and to form when in use hinges between the panels, thereby creating a hinged series of panels positionable at will in closely spaced parallel relation or in aligned relation, the joined portions of the sheathing forming the sole hinge between the panels, a track for slidably mounting said panels at the top of said doorway as a first support means for said closure, and slides mounted only at the top and centrally of each of said panels to form a second support means for said closure, said first and second support means being slidably engaged one with another with little lateral play and said first and second support means pivotally connecting said panels with respect to said track whereby the first and second support means afford stability to said closure while permitting free opening and closing thereof.*

*14. A foldable closure for doorways which comprises, a plurality of thin, flat, elongate, relatively stiff, form-retaining, uniformly dimensioned panels adapted to form a door when in aligned position, a flexible ornamental sheathing on both sides of said panels supported by and joined between said panels to space the panels from each other and to form when in use hinges between the panels,*

*thereby creating a hinged series of panels positionable at will in closely spaced parallel relation or in aligned relation, the joined portions of the sheathing forming the sole hinge between the panels, a track for slidably mounting said panels at the top of said doorway as a first support means for said closure, and slides mounted only at the top and centrally of each of said panels to form a second support means for said closure, means for mounting said slides on said panels for pivotal movement about axes generally parallel to the hinges between the panels, said first and second support means being slidably engaged one with another with little lateral play*

*and said first and second support means pivotally connecting said panels with respect to said track whereby the first and second support means afford stability to said closure while permitting free opening and closing thereof.*

References Cited in the file of this patent or the original patent

| | | |
|---|---|---|
| 1,024,305 | Applas | Apr. 23, 1912 |
| 1,558,533 | Cone | Oct. 27, 1925 |
| 1,877,950 | Nordell | Sept. 20, 1932 |
| 2,325,992 | Wirthman | Aug. 3, 1943 |